United States Patent
Matsuda et al.

(10) Patent No.: US 7,822,079 B2
(45) Date of Patent: Oct. 26, 2010

(54) LASER BEAM PROCESSING APPARATUS

(75) Inventors: Yasushi Matsuda, Chiba-ken (JP);
Hidenori Shimada, Chiba-ken (JP);
Masayuki Akagi, Chiba-ken (JP)

(73) Assignee: Miyachi Corporation, Chiba-ken (JP)

( * ) Notice: Subject to any disclaimer, the term of this patent is extended or adjusted under 35 U.S.C. 154(b) by 187 days.

(21) Appl. No.: 12/267,928

(22) Filed: Nov. 10, 2008

(65) Prior Publication Data
US 2009/0071948 A1    Mar. 19, 2009

Related U.S. Application Data

(62) Division of application No. 11/653,928, filed on Jan. 17, 2007, now Pat. No. 7,489,711.

(30) Foreign Application Priority Data
Jan. 17, 2006    (JP) .............................. 2006-008367

(51) Int. Cl.
*H01S 3/30*    (2006.01)

(52) U.S. Cl. ...................... 372/6; 372/50.23; 372/101; 372/108

(58) Field of Classification Search .............. 372/6, 372/50.23, 101
See application file for complete search history.

(56) References Cited

U.S. PATENT DOCUMENTS

| 5,774,619 | A | 6/1998 | Bruesselbach |
| 6,489,985 | B1 * | 12/2002 | Brodsky et al. .............. 347/247 |
| 2006/0065640 | A1 | 3/2006 | Lizotte et al. |
| 2006/0279821 | A1 | 12/2006 | Riley et al. |
| 2008/0024777 | A1 | 1/2008 | Wang et al. |
| 2010/0027570 | A1 * | 2/2010 | Lizotte et al. ................... 372/6 |

FOREIGN PATENT DOCUMENTS

JP    2000-89160    3/2000

* cited by examiner

*Primary Examiner*—Dung T Nguyen
(74) *Attorney, Agent, or Firm*—Wenderoth, Lind & Ponack, L.L.P.

(57) ABSTRACT

This laser beam processing apparatus includes a fiber laser oscillator, a laser beam branching unit, a laser beam injecting unit, a fiber transmission system, a laser beam irradiating unit, and a processing table. Based on a fiber laser beam, which is oscillation-outputted from the fiber laser oscillator, the laser beam branching unit executes simultaneous multi-branching from the fiber laser beam into a plurality of branched laser beams. The laser beam injecting unit injects the branched laser beams respectively into optical fibers for transmission and the laser beam irradiating units condense and apply the branched laser beams from the optical fibers for transmission respectively to processing points.

1 Claim, 6 Drawing Sheets

LASER BEAM PROCESSING APPARATUS

This is a Rule 1.53(b) Divisional Application of Ser. No. 11/653,928, filed Jan. 17, 2007 now U.S. Pat. No. 7,489,711.

BACKGROUND OF THE INVENTION

1. Field of the Invention

The present invention relates generally to a laser beam processing apparatus that applies desired laser beam processing by irradiating a laser beam to a work to be processed, and, more particularly, to a laser beam processing apparatus employing a multi-branching and fiber-transmission scheme.

2. Description of the Related Art

Conventionally, in the field of laser beam processing such as laser welding and laser marking, to execute multi-point simultaneous processing or multi-position processing, a scheme is employed according to which: a laser beam generated by one laser oscillator is branched into a plurality of laser beams simultaneously or non-simultaneously (in a time-division manner); the branched laser beams are transmitted respectively in optical fibers to remote sites for processing; and the laser beams are applied to desired processing points.

Until the present, a YAG laser is used for a laser oscillator employing the above scheme. The YAG laser uses a rod of a YAG crystal doped with a rare-earth element, so called a YAG rod, as an active medium thereof. An active element contained in a YAG rod is optically pumped by applying an excitation ray to a side face or an end face of the YAG rod. A YAG laser beam is taken out by resonance-amplifying, using an optical resonator, an oscillated light beam having a predetermined wavelength emitted from the YAG rod in the axial direction. The YAG laser beam oscillation-outputted from the YAG laser is split into a plurality of branched laser beams using a beam splitter for simultaneous branching, or the optical path thereof is switched using a movable mirror among a plurality of branch paths for non-simultaneous branching (time division). Each of the branched laser beams obtained as above is condensed and injected onto an end face of a transmitting optical fiber by an injecting optical system, propagates in the transmitting optical fiber, exits from another end face of the fiber in an irradiating unit disposed in a remote processing site, and is condensed and applied to a processing point on a work to be processed by an irradiation optical system of the irradiating unit. For example, in the laser welding, a processing point of a two-layer metal plate is melted by the energy of a YAG laser beam and the melted portion solidifies and makes a weld nugget after the application of the laser beam.

However, for the above conventional laser beam processing apparatus, because the beam quality of the YAG laser light oscillation-outputted from a YAG laser is not so excellent, the precision and the efficiency of the multi-branching and the fiber transmission are poor and, as a result, the quality of the multi-point simultaneous processing and multi-position processing needs to be improved. That is, the beam divergence angle of a YAG laser light is so large that is not negligible in a multi-branching optical system and a fiber transmission optical system. In addition, not only the beam divergence angle but also the beam mode, (especially the lateral mode), are varied due to the thermal lens effect of the YAG rod. Therefore, problems have arisen that light convergence is poor, and that accurate control of the power dividing ratio of the branched laser beams is difficult, etc. As a result, the problems influence the workability.

SUMMARY OF THE INVENTION

The present invention was conceived in view of the above problems and the object thereof is to provide a laser beam processing apparatus of the multi-branching and fiber-transmission scheme that improves the quality of multi-point simultaneous processing and multi-position processing by improving the convergence of the laser beam and stabilizing the beam mode and the power dividing ratio and, in addition, the numerical aperture of the fiber transmission optical system.

In order to achieve the above object, according to a major aspect of the present invention there is provided a laser beam processing apparatus comprising a fiber laser oscillator having an optical fiber configuration that is adapted to employ a core containing an emission element as an active medium and to oscillate and output a raw laser beam having a predetermined wavelength by exciting the core using a predetermined excitation beam; a laser beam branching unit that branches the raw laser beam created by the fiber laser oscillator into a plurality of branched laser beams simultaneously or non-simultaneously; a laser beam injecting unit that injects the branched laser beams obtained from the laser beam branching unit into an end face of an optical fiber for transmission; and a laser beam irradiating unit that condenses and applies the branched laser beams exited from another end face after propagating the optical fiber for transmission.

In the above configuration, based on a fiber laser beam oscillation-outputted by a fiber laser oscillator of an optical fiber structure: a laser beam branching unit executes simultaneous multi-branching or non-simultaneous (time division) branching from a fiber laser beam to a plurality of branched laser beams; a laser beam injecting unit injects the branched laser beams respectively to transmitting optical fibers; and a laser beam irradiating unit condenses and applies the branched laser beams from the transmitting optical fibers respectively to processing points. Each of the fiber laser beams has a small beam diameter and a small beam divergence angle, and the beam mode thereof and the beam polarization distribution thereof are stable. Therefore, predetermined laser characteristics can be obtained in terms of the power dividing ratio, the light convergence, the numerical apertures (NAs) for injection and irradiating, etc., and, as a result, the processing quality of the multi-branching and fiber-transmission scheme can be improved.

According to a preferred aspect of the present invention, a fiber laser oscillator includes an optical pumping unit that injects an excitation ray onto an end face or end faces of an optical fiber for oscillation. The optical pumping unit preferably includes a laser diode that emits an excitation ray, and an optical lens that condenses the excitation ray from the laser diode onto an end face of the optical fiber for oscillation.

According to another preferred aspect, the laser beam branching unit disposes one or a plurality of beam splitter(s), each having a desired reflectance coefficient and a desired transmission coefficient for the wavelength of the raw laser beam from the fiber laser oscillator, on the optical axis of the raw laser beam being spaced at predetermined intervals, and produces each reflected beam obtained from each of the splitter(s) as a branched laser beam. Preferably, a coating film that varies seamlessly in a predetermined direction the reflectance coefficient thereof and the transmission coefficient thereof for the wavelength of the raw laser beam is formed on each of the splitter(s).

According to yet another preferred aspect, the laser beam irradiating unit includes a scanning optical system that scans the branched laser beam(S) exited from the other end face of the optical fiber for transmission. Such a scanning type is useful for marking processing, etc.

According to the laser beam processing apparatus of the present invention, because of the above configuration and actions, in the multi-branching and fiber-transmission scheme, the convergence, the beam mode, the power dividing ratio, the numerical apertures, etc., of the laser beam can be improved and, as a result, the quality of the multi-point simultaneous processing and the multi-position processing can be improved.

BRIEF DESCRIPTION OF THE DRAWINGS

The above and other objects, aspects, features and advantages of the present invention will become more apparent from the following detailed description when taken in conjunction with the accompanying drawings, in which.

DESCRIPTION OF THE PREFERRED EMBODIMENTS

Description will be given for a preferred embodiment of the present invention with reference to the accompanying drawings.

Figure 1:
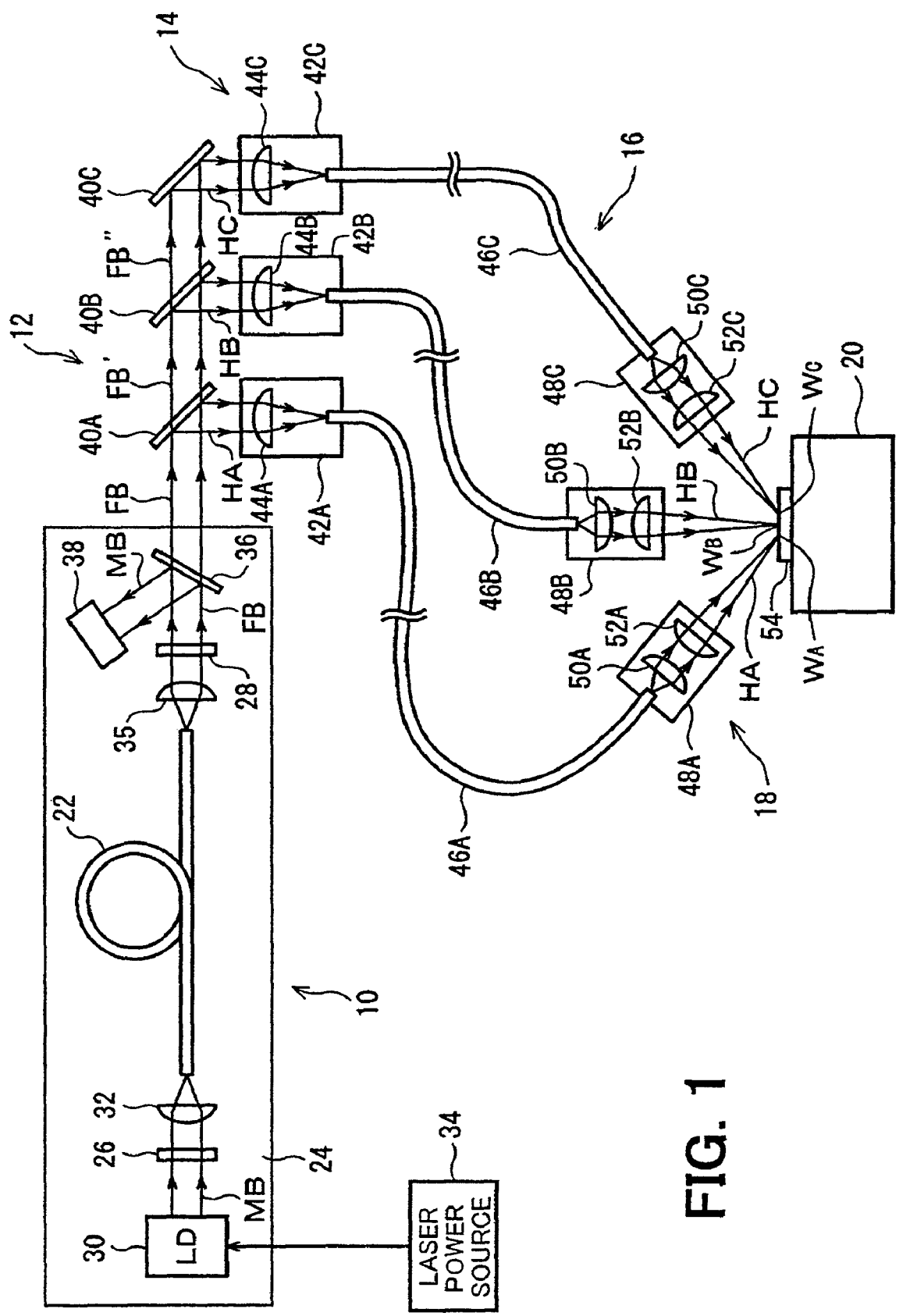
FIG. 1 depicts the configuration of a laser beam processing apparatus in an embodiment of the present invention.

FIG. 1 depicts the configuration of a laser beam processing apparatus in an embodiment of the present invention. The laser beam processing apparatus is configured by a fiber laser oscillator 10, a laser beam branching unit 12, a laser beam injecting unit 14, a fiber transmission system 16, a laser beam irradiating unit 18, and a processing table 20, etc.

The fiber laser oscillator 10 has an optical fiber for oscillation (hereinafter, "oscillating fiber") 22, an electric optical pumping unit 24 that irradiates an excitation beam MB for optically pumping onto an end face of the oscillating fiber 22, and a pair of optical resonator mirrors 26 and 28 optically facing each other through the oscillating fiber 22.

The electric optical pumping unit 24 includes a laser diode (LD) 30 and an optical lens for condensing the light. The LD 30 is turned on and driven by an excitation current from a laser power source 34 and oscillation-outputs the laser beam MB for excitation. The optical lens 32 condenses and injects the laser beam MB for excitation from the LD 30 onto an end face of the oscillating fiber 22. The optical resonator mirror 26 disposed between the LD 30 and the optical lens 32 is adapted to transmit the laser beam MB for excitation injected from the LD 30 and to totally reflect, on the optical axis of the resonator, the excitation beam injected from the oscillating fiber 22.

Though illustration being omitted, the oscillating fiber 22 includes a core doped with ions of, for example, a rare-earth element as a luminous element and a clad surrounding the core coaxially, and uses the core as the active medium and the clad as the propagation optical path of the excitation beam.

The excitation laser beam MB injected onto the end face of the oscillating fiber 22 as above propagates in the axial direction in the oscillating fiber 22 being confined by the total reflection on the clad outer circumferential interface, and optically excites the rare-earth element ions in the core by crossing many times the core during the propagation. In this manner, an oscillation beam having a predetermined wavelength is emitted in the axially direction from both end faces of the core. The oscillation beam goes and returns many times between the optical resonator mirrors 26 and 28 and, thereby, is resonance-amplified, and a fiber laser beam FB having the predetermined wavelength is taken out from the optical resonator mirror 28, which is a partially reflecting/transmitting mirror.

In the optical resonator, the optical lenses 32 and 35 collimate the oscillation beam emitted from the end face of the oscillating fiber 22 into a parallel beam, direct the parallel beam to the optical resonator mirrors 26 and 28, and condense on the end face of the oscillating fiber 22 the oscillation beam reflected and returned by the optical resonator mirrors 26 and 28. The laser beam MB for excitation having passed the oscillating fiber 22 is transmitted through the optical lens 35 and the optical resonator mirror 28 and, thereafter, is returned by a returning mirror 36 being directed to a laser absorber 38 on the side. The fiber laser beam FB outputted from the optical resonator mirror 28 is transmitted straight through the returning mirror 36 and enters the laser beam branching unit 12 adjacent thereto.

The laser beam branching unit 12 in the depicted exemplary configuration is of a simultaneous-tri-branching type that disposes in a line three branching mirrors 40A, 40B, and 40C spaced at predetermined intervals on an extended line of the optical axis of the fiber laser oscillator 10 and each inclined obliquely at a predetermined angle (for example, 45 degrees). The two branching mirrors 40A and 40B respectively in a first stage and a second state of the three mirrors, respectively, include partially reflecting/transmitting mirrors or beam splitters and the mirror 4C in the final stage includes a total reflection mirror. When the power dividing ratio of the simultaneous tri-branching is selected to be 1:1:1, the branching ratio of the first stage beam splitter 40A is selected to be about 33/67 and the branching ratio of the second stage beam splitter 40B is selected to be about 50/50.

In the laser beam branching unit 12, the fiber laser beam FB propagated straight in the air from the fiber laser oscillator 10 enters the first stage beam splitter 40A and a portion of the beam FB is reflected in a predetermined direction in the splitter 40A and the rest of the beam FB is transmitted straight. A reflected beam obtained by the beam splitter 40A, that is, a first branched laser beam HA enters an end face of a first transmitting optical fiber (hereinafter, "transmitting fiber") 46A of the fiber transmission system 16 through a first injecting unit 42A of the laser beam injecting unit 14.

The laser beam FB' transmitted through the first stage beam splitter 40A enters the second stage beam splitter 40B and a portion of the beam FB' is reflected in a predetermined direction in the splitter 40B and the rest of the beam FB' is transmitted straight. A reflected beam obtained by the beam splitter 40B, that is, a second branched laser beam HB enters an end face of a second transmission fiber 46B of the fiber transmission system 16 through a second injecting unit 42B of the laser beam injecting unit 14.

The laser beam FB" transmitted through the second stage beam splitter 40B is totally reflected by the total reflection mirror in the final stage in a predetermined direction and enters as a third branched laser beam HC an end face of a third transmission fiber 46C of the fiber transmission system 16 through a third injecting unit 42C of the laser beam injecting unit 14.

Condenser lenses 44A, 44B, and 44C that respectively condense the branched laser beams HA, HB, and HB respectively onto the end faces of the transmitting fibers 46A, 46B, and 46C are provided respectively in the injecting units 42A, 42B, and 42C of the laser beam injecting unit 14. For example, SI (Step Index)-type fibers are used for the transmitting fibers 46A, 46D, and 46C.

The other ends or terminal ends of the first, the second, and the third transmitting fibers 46A, 46B, and 46C are respectively connected to first, second, and third irradiating units 48A, 48B, and 48C of the laser beam irradiating unit 18. In the embodiment depicted, the first, the second, and the third irradiating units 48A, 48B, and 48C condense and irradiate simultaneously the first, the second, and the third branched laser beams HA, HB, and HC respectively to three processing points $W_A$, $W_B$, and $W_C$ set on one work 50 to be processed on the processing table 20, and the three processing points $W_A$, $W_B$, and $W_C$ are simultaneously laser-processed.

For example, for simultaneous welding at three points, due to supply of an excitation current having a pulse waveform from the laser power source 34 to the LD 30, the excitation laser beam MB is supplied from the LD 30 to the oscillating fiber 22 in the fiber laser oscillator 10 and, thereby, the fiber laser beam FB having a pulse waveform is oscillation-outputted from the fiber laser oscillator 10. From the fiber laser beam FB, the three branched laser beams HA, HB, and HC each having a pulse waveform are obtained that have been formed by dividing the beam FB having a pulse waveform into three by the laser beam branching unit 12 in the power dividing ratio of 1:1:1. These three branched pulse laser beams HA, HB, and HC respectively pass through: the injecting units 42A, 42B, and 42C of the laser beam injecting unit 14; the transmitting fibers 46A, 46B, and 46C of the fiber transmission system 16; and the irradiating units 48A, 48B, and 48C of the laser irradiating unit 18, and are respectively condensed and irradiated onto the three processing points $W_A$, $W_B$, and $W_C$ set on a work 54 to be processed on the processing table 18. At each of the processing points $W_A$, $W_B$, and $W_C$, a material to be processed is melted by the energy of each of the branched laser beams HA, HB, and HC and, after the application of the laser pulses, solidifies and forms nuggets.

The irradiating units 48A, 48B, and 48C respectively include: collimating lenses 50A, 50B, and 50C that respectively collimate into parallel beams the branched laser beams HA, HB, and HC exited respectively from the end faces of the transmission fibers 46A, 46B, and 46C; and condenser lenses 52A, 52B, and 52C that respectively condense the branched laser beams HA, HB, and HC that are parallel beams, onto the processing points $W_A$, $W_B$, and $W_C$.

As above, the laser beam processing apparatus of the embodiment creates the raw laser beam that is the basis of the branched laser beams using the fiber laser oscillator 10. The fiber laser oscillator 10 employs the oscillating fiber 22 including an elongated core having a diameter of about 10 μm and a length of about several meters as the active medium and, therefore, can oscillation-output the fiber laser beam FB having a small beam diameter and a small divergence angle. In addition, the excitation laser beam MB injected into the end face of the oscillating fiber 22 consumes completely the excitation energy thereof by crossing many times the core while the beam MB propagates on a several-meters-long long optical path in the oscillating fiber 22 and, therefore, the oscillator 10 can create the fiber laser beam FB at a very high oscillation efficiency. A YAG rod used as an active medium of a YAG laser has: a diameter of generally 4 to 10 mm; a length of generally 80 to 160 mm; a large beam diameter; a large beam divergence angle; small optical coupling of an excitation beam injected into the rod and the active element; and low oscillation efficiency.

Because the core of the oscillating fiber 22 generates no thermal lens effect, the fiber laser oscillator 10 can create the fiber laser beam FB having a very stable beam mode. Because the beam mode is stable, the polarization distribution of the beam is stable. This fact is also a very important advantage in the multi-branching and fiber-transmission scheme.

Figure 2:
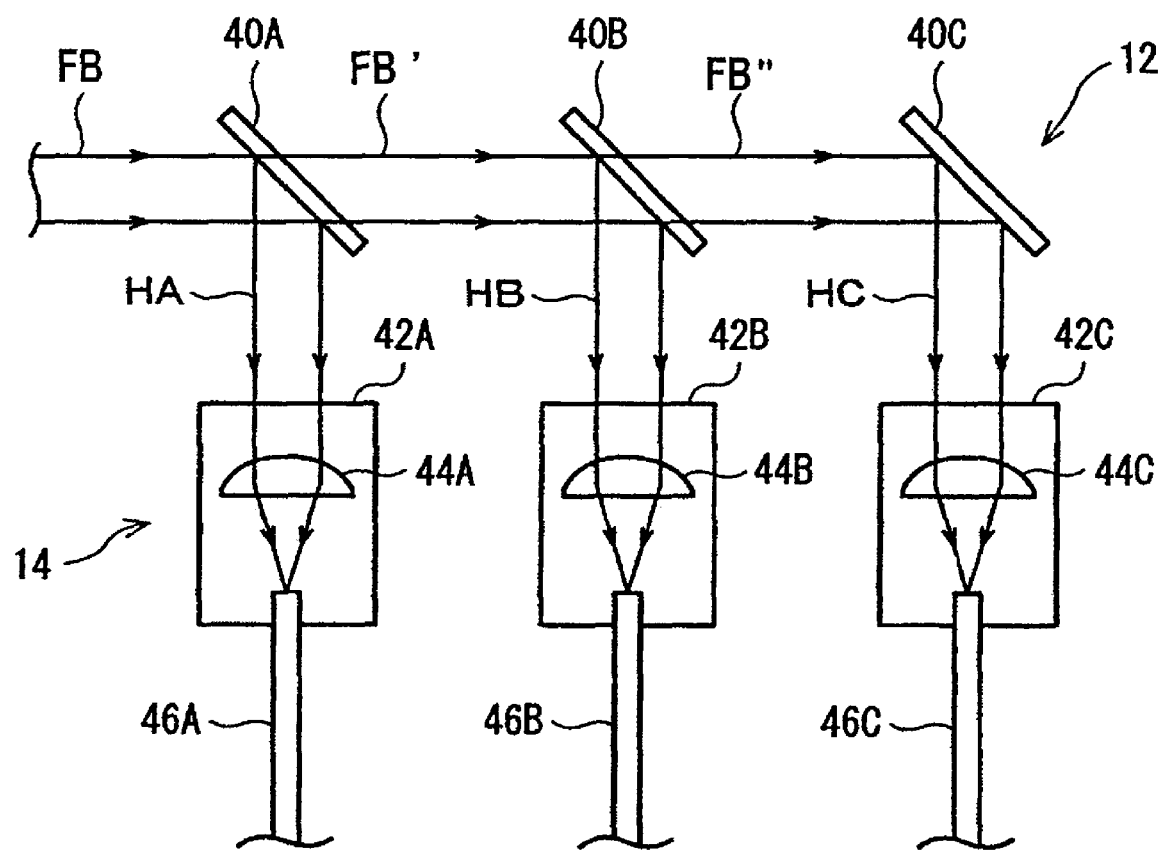
FIG. 2 depicts an action of a laser beam branching unit in the embodiment.

Description will be given for the operation of the laser beam branching unit 12 in the embodiment referring to FIGS. 2 and 3. As depicted in FIG. 2, the beam divergence angle of the fiber laser beam FB outputted from the fiber laser oscillator 10 (FIG. 1) is very small and, therefore, the beam FB enters the branching mirrors 40A, 40B, and 40C respectively at stages each having different optical path lengths or different propagation distances, with almost same beam diameters. Therefore, the branched laser beams HA, HB, and HC having almost same beam diameters can be obtained from the branching mirrors 40A, 40B, and 40C. Thereby, in the laser beam injecting unit 14, the injection optical systems respectively of the injecting units 42A, 42B, and 42C can be disposed respectively taking almost same optical path lengths or distances of spacing from the branching mirrors 40A, 40B, and 40C. Therefore, easier adjustment of the injection optical systems and reduction of the foot print can be facilitated.

Figure 3:
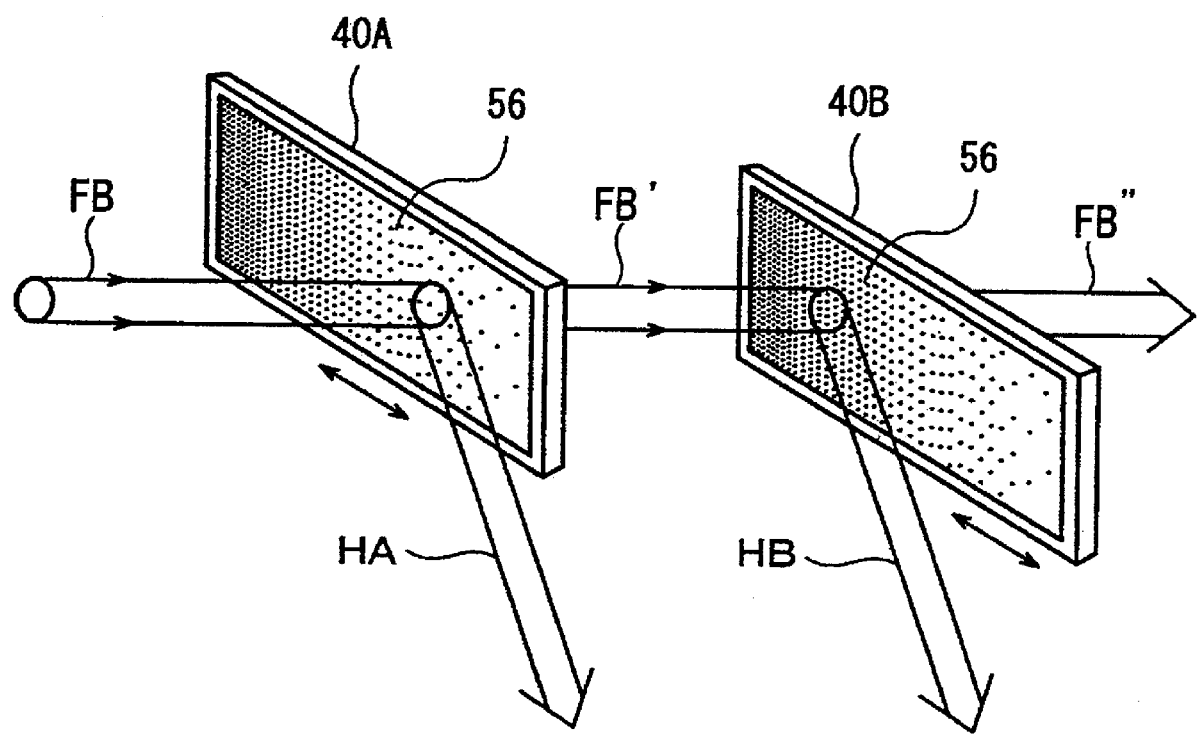
FIG. 3 depicts an action of the laser beam branching unit in the embodiment.

As depicted in FIG. 3, each of the beam splitters 40A and 40B is formed with a coating film 56 on the splitter that varies seamlessly the reflectance coefficient thereof and the transmission coefficient thereof in a predetermined direction (for example, the direction indicated by arrows in FIG. 3), and the branching ratio of each of the splitters can be adjusted by varying the incident position in that direction. In this case, each of the reflectance coefficient and the transmission coefficient at each position is not always the same for P-polarization and S-polarization and, it is general that difference or divergence is present in the reflectance coefficient and the transmission coefficient between the P- and the S-polarization as, for example, the reflectance coefficient for P-polarization is 30% and the reflectance coefficient for S-polarization is 60% at a predetermined position at which the total reflectance coefficient is 50%. Therefore, when the ratio of the P-polarization and the S-polarization is varied due to fluctuated beam mode or beam polarization distribution of the injected laser beam, the total reflectance coefficient is varied at the incident position and, as a result, the power of the reflected beam is varied. In terms of this, in the embodiment, because the beam mode of the fiber laser beam FB outputted from the fiber laser oscillator 10 is stable and the polarization distribution is also stable, the total reflectance coefficient at the incident position being set of each of the beam splitters 40A and 40B can be maintained to be constant and the branched laser beams HA, HB, and HC in the power dividing ratio as having been set can be obtained from the mirrors 40A, 40B, and 40C respectively in the stages.

As above, because each of the branched laser beams HA, HB, and HC has a small beam divergence angle and has the stable beam mode, the beams HA, HB, and HC are excellent in beam convergence for the transmission fibers 46A, 46B, and 46C in the laser beam injecting unit 14 and the laser beam irradiating unit 18 and the injection and irradiation numerical apertures (NAs) are excellent (stable). Therefore, high precision and highly efficient fiber transmission is enabled. Thereby, to condense the branched laser beams HA, HB, and HC onto the processing points $W_A$, $W_B$, and $W_C$ each having the divided power as having been set and at the same distance is enabled, and the quality of the simultaneous multi-branched laser beam processing can be improved.

Figure 4:
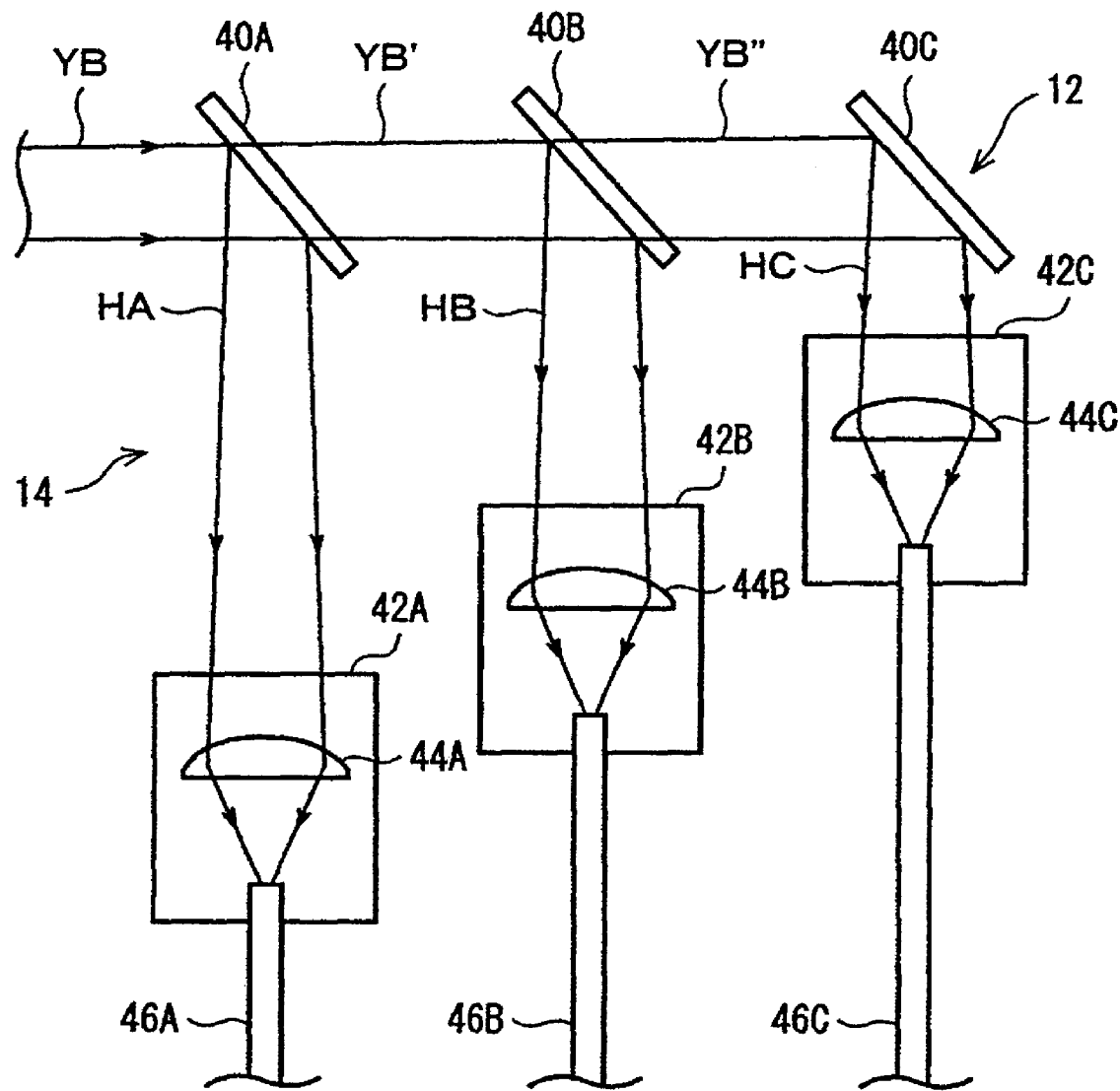
FIG. 4 depicts an action of a laser beam branching unit in a comparable embodiment.
Figure 5:
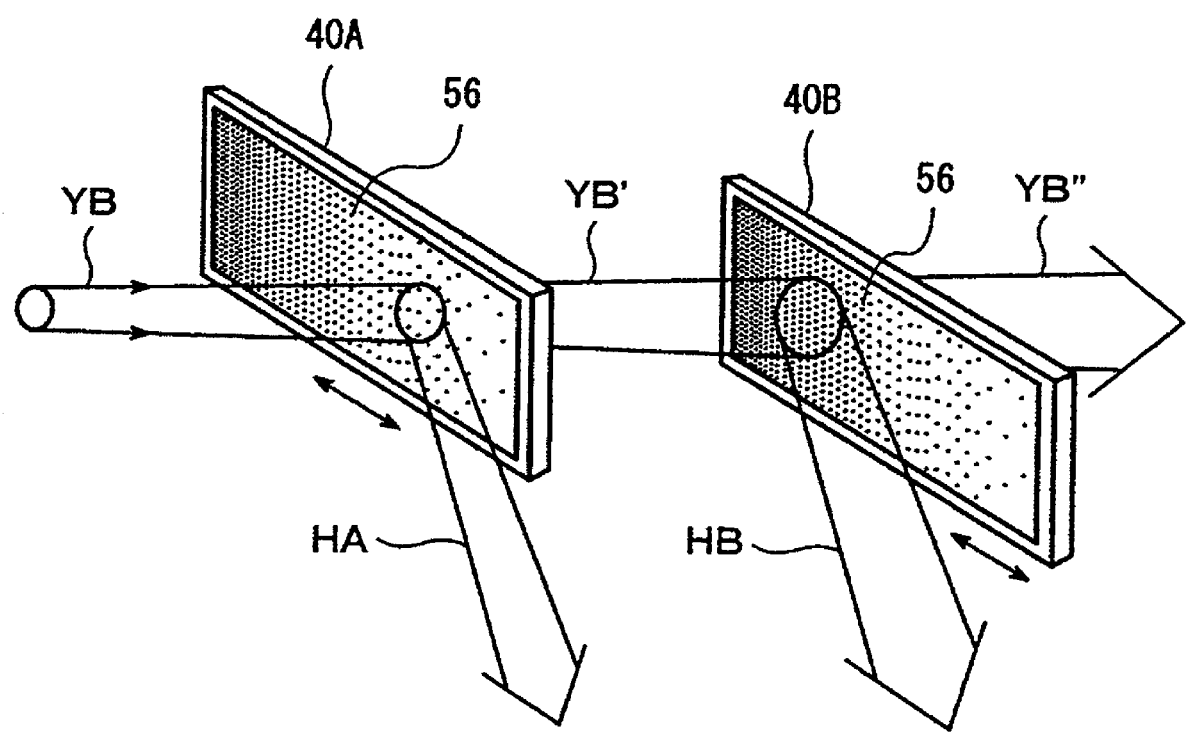
FIG. 5 depicts an action of the laser beam branching unit in the comparable embodiment.

As a comparable embodiment, FIGS. 4 and 5 depict the operation in the case where a YAG laser beam YB obtained by a YAG laser enters the laser beam branching unit 12. As depicted in FIG. 4, because the YAG laser beam YB has a large beam divergence angle, the beam YB enters each of the mirrors 40A, 40B, and 40C in each stage with a larger beam diameter as the optical path length becomes longer and, therefore, the branched laser beams HA, HB, and HC each having a beam diameter different from each other are obtained respectively from the mirrors 40A, 40B, and 40C respectively in the stages. Therefore, in the laser beam injecting unit 14, the beam diameter must be corrected by providing large differences among the optical path lengths or the distances of spacing respectively from the mirrors 40A, 40B, and 40C to the injecting optical systems of the injecting units 42A, 42B, and 42C and, therefore, adjustment of the injecting optical systems is complicated and the foot print is large. As depicted in FIG. 5, in the beam splitters 40A and 40B respectively in stages, the beam diameters of the injected laser beams YB and YB' are large and, therefore, the deviation of the reflectance coefficient at the reflection spots are large to the extent of the large beam diameters. As a result, the beam quality of the branched laser beams HA and HB is degraded. The beam quality of the branched laser beam HC passing through the beam splitters 40A and 40B is also degraded. Because the beam mode or the polarization distribution of the YAG laser beam YB is fluctuated by the lens effect as above, the degradation of the beam quality becomes more prominent.

Though the reflected beams from the processing points W may return to the fiber laser oscillator 10 through the laser beam irradiating unit 18, the fiber transmission unit 16, the laser beam injecting unit 14, and the laser beam branching unit 12, the returned beams may be confined in the oscillating fiber 22 by making the numerical aperture (NA) of the oscillating fiber 22 larger than the numerical aperture (NA) of the transmitting fiber 46 and, therefore, (without setting the NA excessively large) breakage of the oscillating fiber 22 due to the returned beam can be prevented.

Though the description has been given for the preferred embodiment of the present invention as above, the above embodiment does not limit the present invention. Those skilled in the art cam make various modifications and changes to the present invention in specific modes of operation thereof without departing from the technical sprit and the technical scope thereof. For example, though the above embodiment is the one of the simultaneous-tri-branching type, the embodiment can execute simultaneous-multi-branching for the number of branches of two or four or more by varying the number of optical components or units in each of the laser beam branching unit 12, the laser beam injecting unit 14, the fiber transmission unit 16, and the laser beam irradiating unit 18. The present invention can be applied to a non-simultaneous (time division)-multi-branching-type laser beam processing apparatus.

Figure 6:
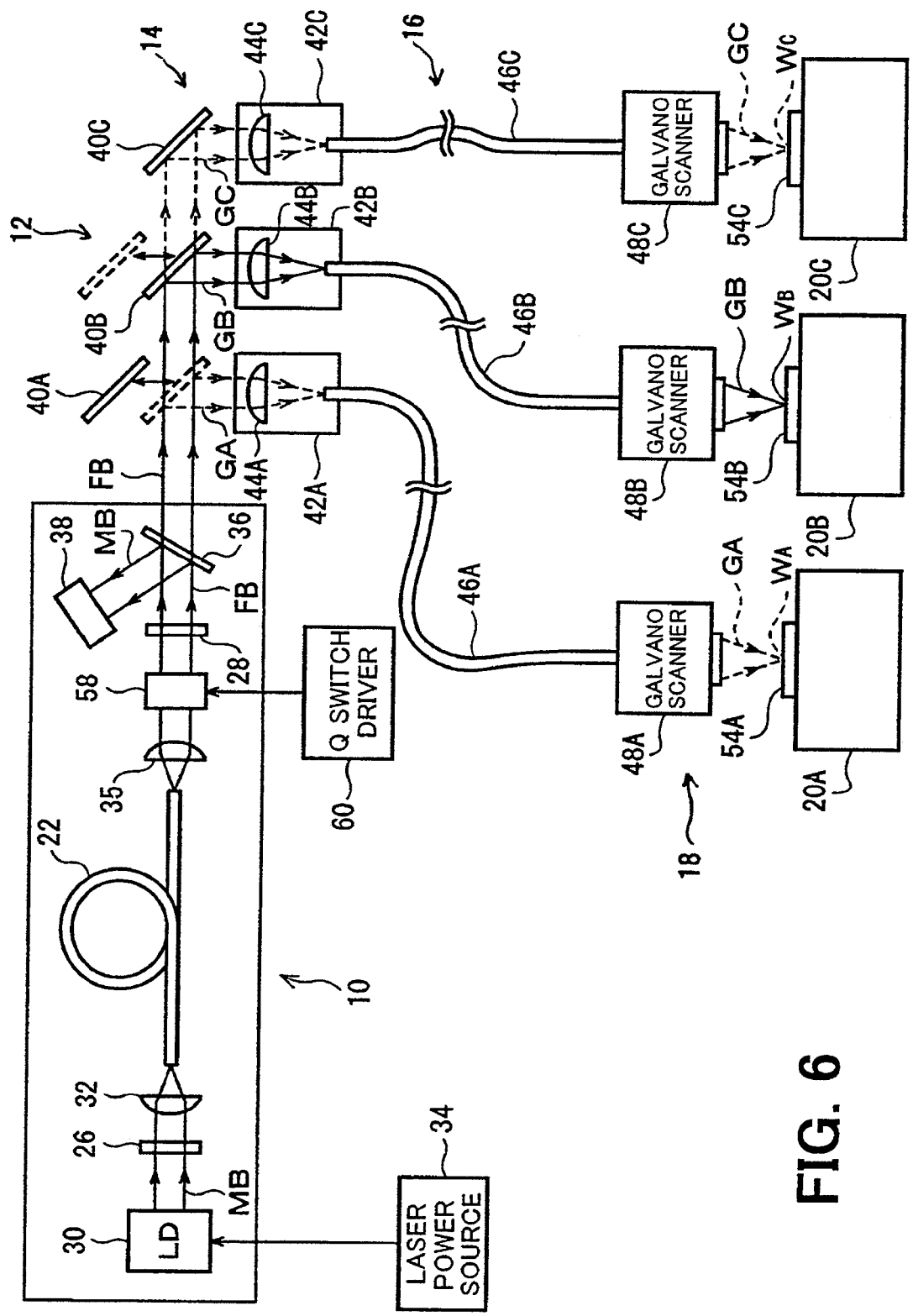
FIG. 6 depicts the configuration of a laser beam processing apparatus in another embodiment.

FIG. 6 depicts the configuration of a non-simultaneous (time division) multi-branching laser beam processing apparatus in an embodiment. In FIG. 6, components and functions substantially same as those of the above simultaneous multi-branching laser beam processing apparatus (FIG. 1) are given the same reference numerals.

The laser beam processing apparatus of FIG. 6 is, for example, for processing for marking and is provided with a Q switch 58 in the fiber laser oscillator 10. In this case, the laser power source 34 continuously turns on and drives the LD 30 and the LD 30 continuously pumps the core (active medium) of the oscillating fiber 22. In this manner, an oscillation ray having a predetermined wavelength generated in the core of the oscillating fiber 22 is confined and amplified between the optical oscillators 26 and 28. The Q switch 58 is, for example, a sound-optic Q switch. A controlling unit not shown drives the Q switch 58 through a Q switch driver 60 using a high-frequency electric signal that turns off intermittently at a predetermined cycle. Every time the high-frequency electric signal turns off, the fiber laser beam FB of a Q switch pulse or a giant pulse having extremely high peak power is oscillation-outputted from the fiber laser oscillator 10.

The laser beam branching unit 12 is configured to include each of the branching mirrors 40A and 40B respectively in the first stage and the second stage as a movable total reflection mirror that is movable in both directions between a first position on the laser optical axis and a second position not on the laser optical axis. The mirror 40C in the final stage or at the end terminal is also a total reflection mirror.

In the depicted example, the total reflection mirror 40A in the first stage is retreated to the second position and the total reflection mirror 40B in the second stage is switched to the first position. In this case: the total reflection mirror 40B in the second stage totally reflects the fiber laser beam FB from the fiber laser oscillator 10; and this reflected beam is condensed and injected onto an end face of the second transmission fiber 46B through the second injecting unit 42B as the second branched laser beam GB; and is transmitted to the second irradiating unit 48B of the laser beam irradiating unit 18 passing through the transmission fiber 46B.

In the embodiment, a galvano scanner is provided in the second irradiating unit 48B. The galvano scanner has a pair of movable mirrors that can swing themselves respectively in two orthogonal directions and, by controlling the orientation of the two movable mirrors at a predetermined angle synchronizing with the Q switching under the control of the controlling unit, the fiber laser beam FB of the Q switch pulse received from the second transmission fiber 46B is condensed and irradiated to a desired marking position on a work 54B to be machined on a processing table 20B.

When the total reflection mirror 40A in the first stage is switched to the first position: the total reflection mirror 40A in the first stage totally reflects the fiber laser beam FB from the fiber laser oscillator 10; and this reflected beam is condensed and injected onto an end face of the first transmission fiber 46A through the first injecting unit 42A as the first branched laser beam GA; and is transmitted to the first irradiating unit 48A of the laser beam irradiating unit 18 passing through the transmission fiber 46A. The second irradiating unit 48B also has a galvano scanner same as above and the galvano scanner scans the fiber laser beam FB of the Q switch pulse received from the first transmission fiber 46A and condenses and applies the beam FB onto a desired marking position on a work 54A to be machined on a processing table 20A.

When each of the first stage mirror 40A and the second stage mirror 40B are retreated to the second position: the total reflection mirror 40C at the end terminal totally reflects the fiber laser beam FB from the fiber laser oscillator 10; and this reflected beam is condensed and injected onto an end face of the third transmission fiber 46C through the third injecting unit 42C as the third branched laser beam GC; and is transmitted to the third irradiating unit 48C passing through the transmission fiber 46C. The third irradiating unit 48C also has a galvano scanner same as above and the galvano scanner scans the fiber laser beam FB of the Q switch pulse received from the third transmission fiber 46C and condenses and applies the beam FB onto a desired marking position on a work 54C to be machined on a processing table 20C.

Though the exemplary configuration depicted is the one of the tri-branching type, the number of branches can be two or four or more by varying the number of optical components or units in each of the laser beam branching unit 12, the laser beam injecting unit 14, the fiber transmission unit 16, and the laser beam irradiating unit 18.

In this embodiment, the fiber laser oscillator 10 can create the fiber laser beam FB of the Q switch pulse having a small beam diameter, a small beam divergence angle, and a stable beam mode or a stable polarization distribution, and the branched laser beams can be obtained from the fiber laser beam FB in the non-simultaneous or time division scheme. Therefore, the injecting optical systems respectively of the injecting units 42A, 42B, and 42C can be disposed respectively at positions separated for almost same distances respectively from the branching mirrors 40A, 40B, and 40C of the laser beam branching unit 12 and, therefore, easier adjustment of the components of the whole optical system and reduction of the foot print and, in addition, improvement of the multi-point processing can be facilitated.

The configurations and schemes of the components can be variously modified in addition to the above embodiments. For example, the configuration of providing a galvano scanner for the irradiating unit 48 can be applied to processing other than marking (for example, laser welding). In the fiber laser oscillator 10, modification and partial omission of the electric optical pumping unit 24, the optical oscillators 26 and 28, the optical lenses 32 and 35, etc., and other components that exert the same functions or actions can be employed. For example, though the above embodiment employs a one-face excitation scheme according to which the excitation laser beam EM is applied to an end face on one side of the oscillating fiber 22, a both-face excitation scheme can be employed according to which the excitation laser beam is applied to the end faces on both side of the oscillating fiber 22.

What is claimed is:
1. A laser beam processing apparatus comprising:
a fiber laser oscillator, having an optical fiber configuration including a core containing an emission element as an active medium, for oscillating and outputting a raw laser beam having a predetermined wavelength by exciting the core using a predetermined excitation beam;
a laser beam branching unit for branching the raw laser beam created by the fiber laser oscillator into a plurality of branched laser beams non-simultaneously, the laser beam branching unit comprising:
at least one movable total reflection mirror, each adapted to be movable in both directions between a first position, on the laser optical axis of the raw laser beam, for reflecting the raw laser beam in a predetermined direction and a second position, not on the laser optical axis of the raw laser, for permitting the raw laser beam to pass straight, and
a fixed total reflection mirror disposed in the rear of the movable total reflection mirror on the laser optical axis of the raw laser beam, and
the laser beam branching unit producing each reflected beam obtained from each movable total reflection mirror or the fixed total reflection mirror as one of the branched laser beams of time-division;
a plurality of optical fibers for transmitting the branched laser beams, respectively, to a common remote laser processing site or different remote laser processing sites, respectively;
a plurality of a laser beam injecting units for injecting the branched laser beams obtained from the laser beam branching unit into an end face of the plural optical fibers, respectively; and
a laser beam irradiating unit that condenses and applies each branched laser beam exiting from another end face of each of the plural optical fibers onto a processing point set on a common work to be processed or onto different respective processing points on different works to be processed.

* * * * *